Figure 1:
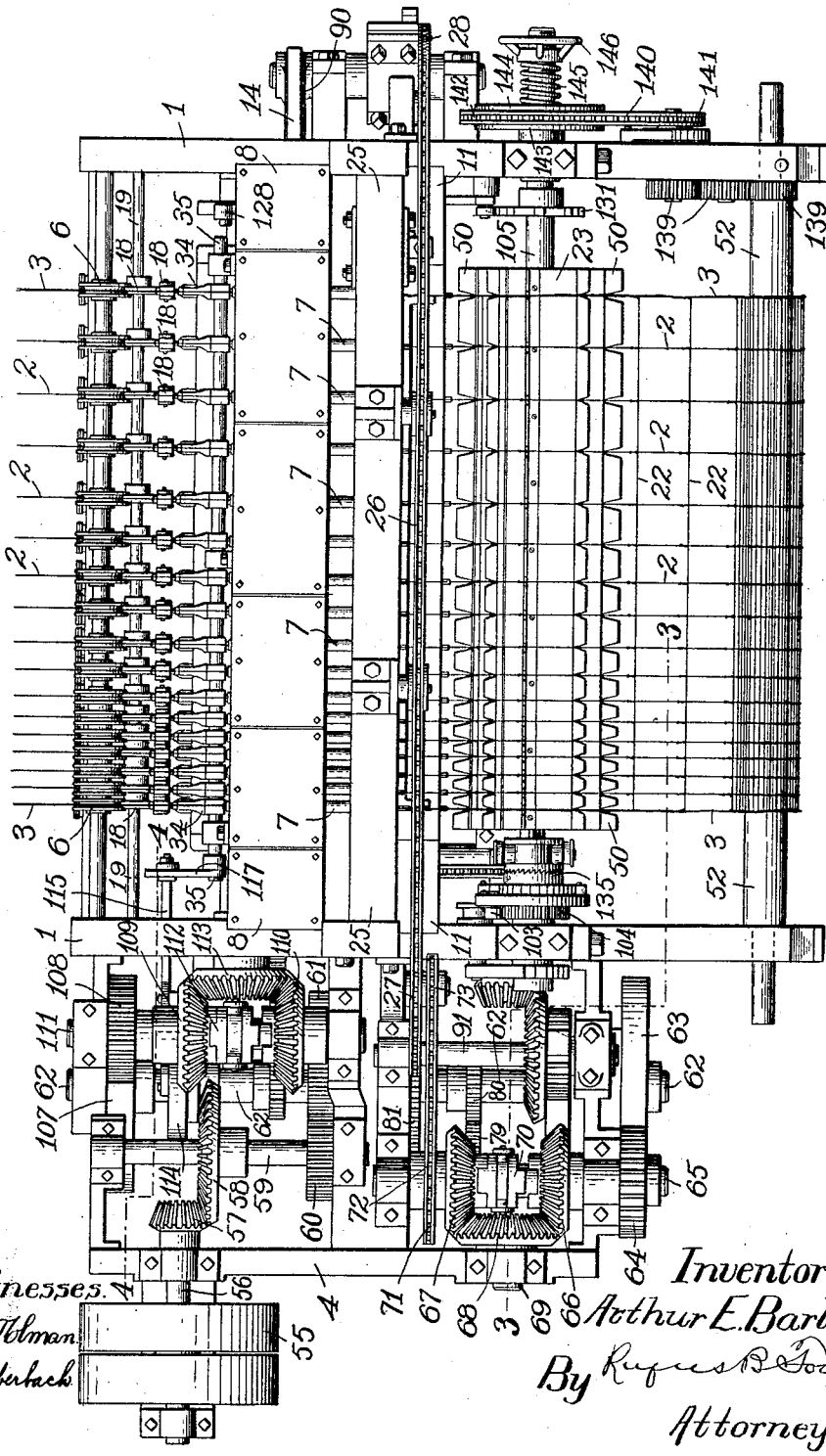

A. E. BARLOW.
MACHINE FOR MAKING WIRE FABRIC.
APPLICATION FILED MAR. 1, 1911.

1,109,563.

Patented Sept. 1, 1914.
8 SHEETS—SHEET 1.

Witnesses:
R. D. Tolman
P. Comberbach

Inventor
Arthur E. Barlow.
By Rufus B. Fowler
Attorney

A. E. BARLOW.
MACHINE FOR MAKING WIRE FABRIC.
APPLICATION FILED MAR. 1, 1911.

1,109,563.

Patented Sept. 1, 1914.
8 SHEETS—SHEET 2.

Witnesses
Roy B. Tolman
Penelope Comberbach

Inventor
Arthur E. Barlow
By Rufus B. Fowler
Attorney

A. E. BARLOW.
MACHINE FOR MAKING WIRE FABRIC.
APPLICATION FILED MAR. 1, 1911.

1,109,563.

Patented Sept. 1, 1914.

8 SHEETS—SHEET 3.

Witnesses.
Roy D. Tolman.
Penelope Cumberbach.

Inventor
Arthur E. Barlow.
By Rufus B. Fowler
Attorney

A. E. BARLOW.
MACHINE FOR MAKING WIRE FABRIC.
APPLICATION FILED MAR. 1, 1911.

1,109,563.

Patented Sept. 1, 1914.

8 SHEETS—SHEET 4.

Witnesses
Roy D. Tofman.
Penelope Cumberbach.

Inventor
Arthur E. Barlow.
By Rufus B. Fowler
Attorney

A. E. BARLOW.
MACHINE FOR MAKING WIRE FABRIC.
APPLICATION FILED MAR. 1, 1911.
1,109,563.
Patented Sept. 1, 1914.
8 SHEETS—SHEET 5.
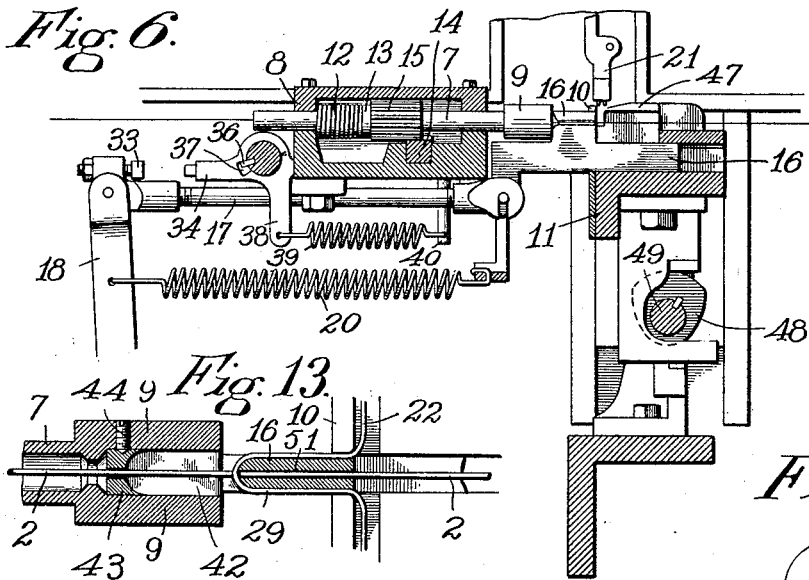
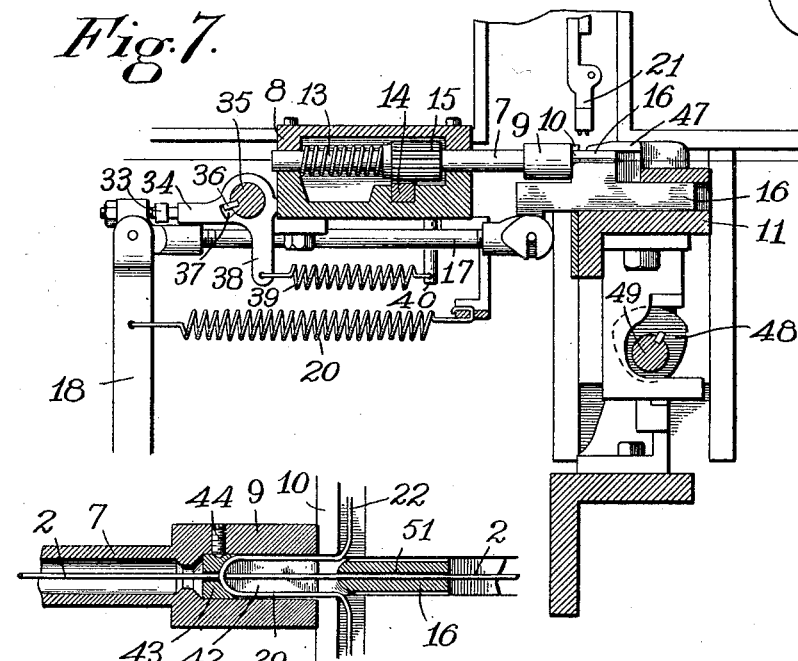
Witnesses
Roy D. Tolman
Penelope Cumberbach
Inventor
Arthur E. Barlow.
By Rufus B. Fowler
Attorney

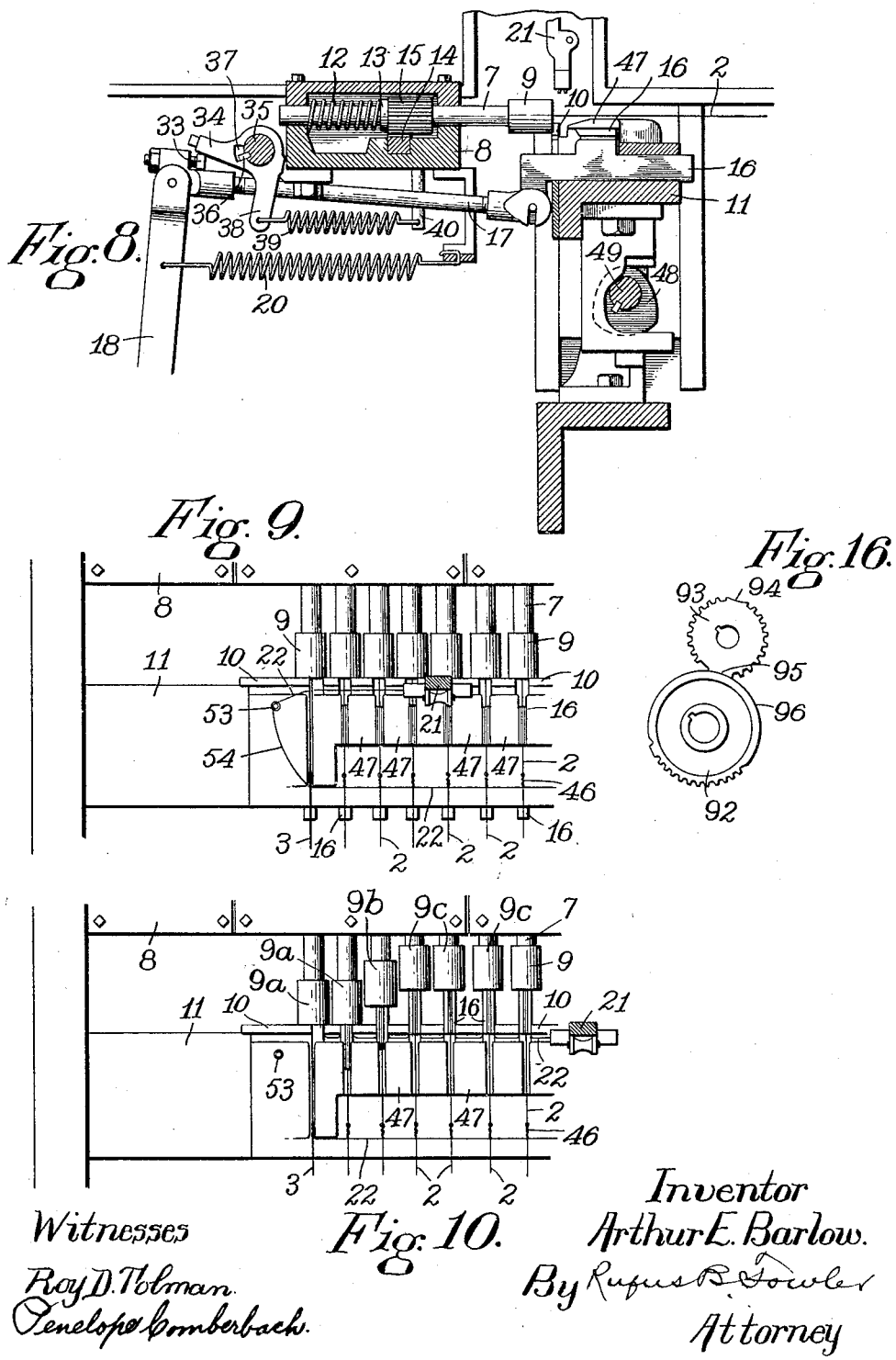

A. E. BARLOW.
MACHINE FOR MAKING WIRE FABRIC.
APPLICATION FILED MAR. 1, 1911.

1,109,563.

Patented Sept. 1, 1914.

8 SHEETS—SHEET 7.

Witnesses
Roy D. Titman.
Penelope Cumberbach.

Inventor
Arthur E. Barlow.
By Rufus B. Fowler
Attorney

A. E. BARLOW.
MACHINE FOR MAKING WIRE FABRIC.
APPLICATION FILED MAR. 1, 1911.

1,109,563.

Patented Sept. 1, 1914.

8 SHEETS—SHEET 6.

Witnesses.
Roy D. Tolman
Penelope Cumberbach

Inventor
Arthur E. Barlow.
By Rufus B. Fowler
Attorney

UNITED STATES PATENT OFFICE.

ARTHUR E. BARLOW, OF WORCESTER, MASSACHUSETTS, ASSIGNOR TO WRIGHT WIRE COMPANY, OF WORCESTER, MASSACHUSETTS, A CORPORATION OF MASSACHUSETTS.

MACHINE FOR MAKING WIRE FABRIC.

1,109,563.  Specification of Letters Patent.  Patented Sept. 1, 1914.

Application filed March 1, 1911. Serial No. 611,692.

*To all whom it may concern:*

Be it known that I, ARTHUR E. BARLOW, a citizen of the United States, residing at Worcester, in the county of Worcester and Commonwealth of Massachusetts, have invented a new and useful Improvement in Machines for Making Wire Fabric, of which the following is a specification, accompanied by drawings forming a part of the same.

My present invention relates to a machine for manufacturing what is known as "square-mesh" wire fabric, in which a series of stay wires are placed across and securely united to a series of strand wires, and the objects of my invention are to provide mechanical means for automatically traversing a stay wire at regular intervals across a series of strand wires, and uniting the stay wire to the strand wires at its points of junction therewith by means of twisted loops automatically formed in the stay wire to form a series of rectangular meshes. These objects, among others, I accomplish by the construction and arrangement of parts as hereinafter described and pointed out in the annexed claims.

Figure 2:
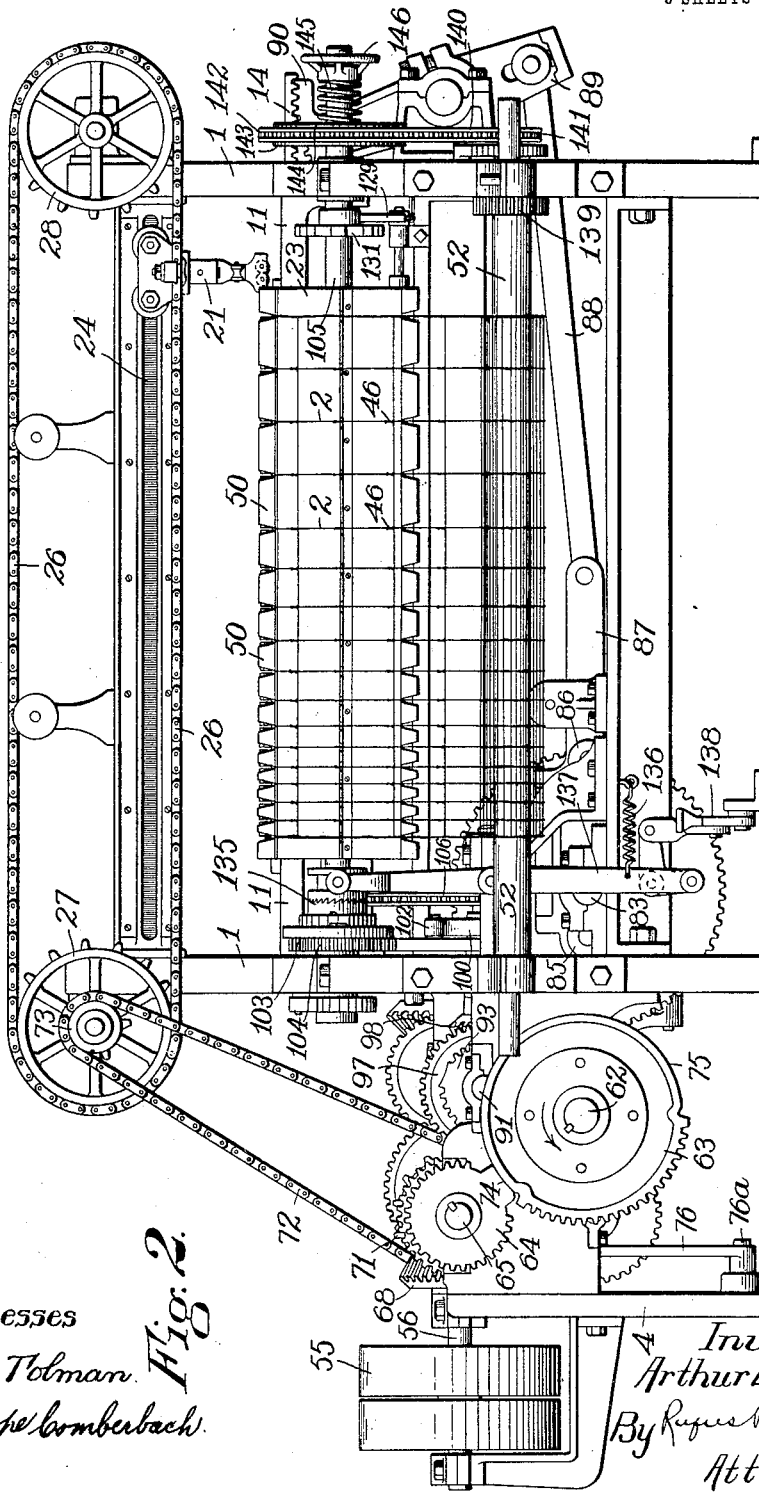
Figure 3:
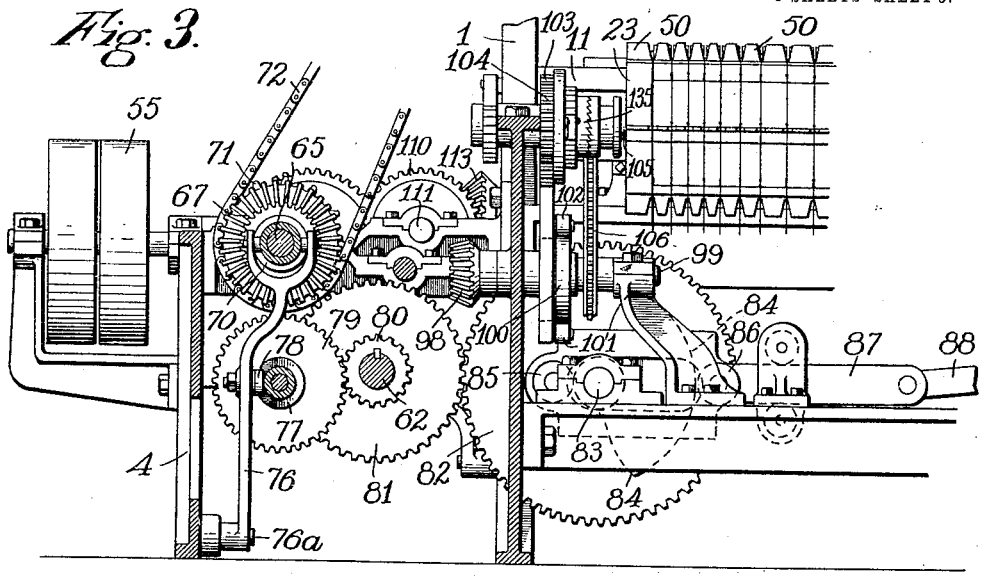
Figure 4:
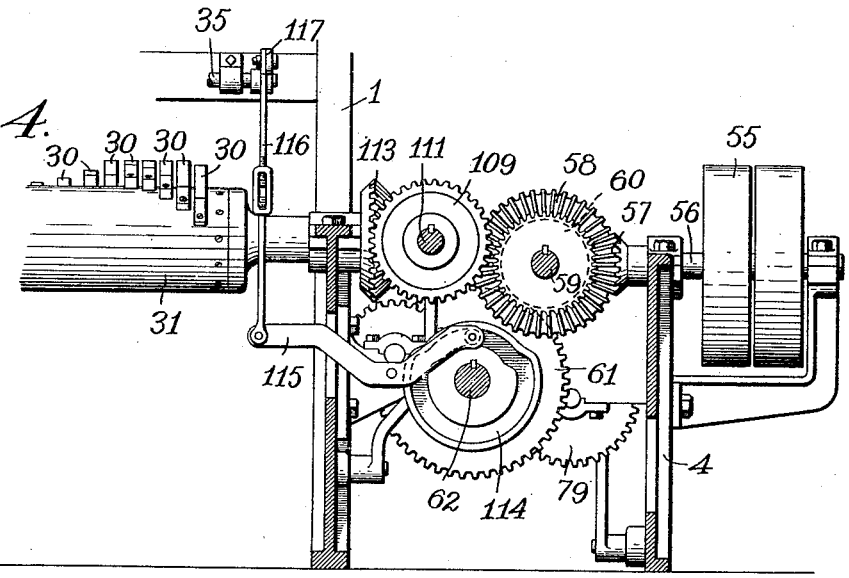
Figure 5:
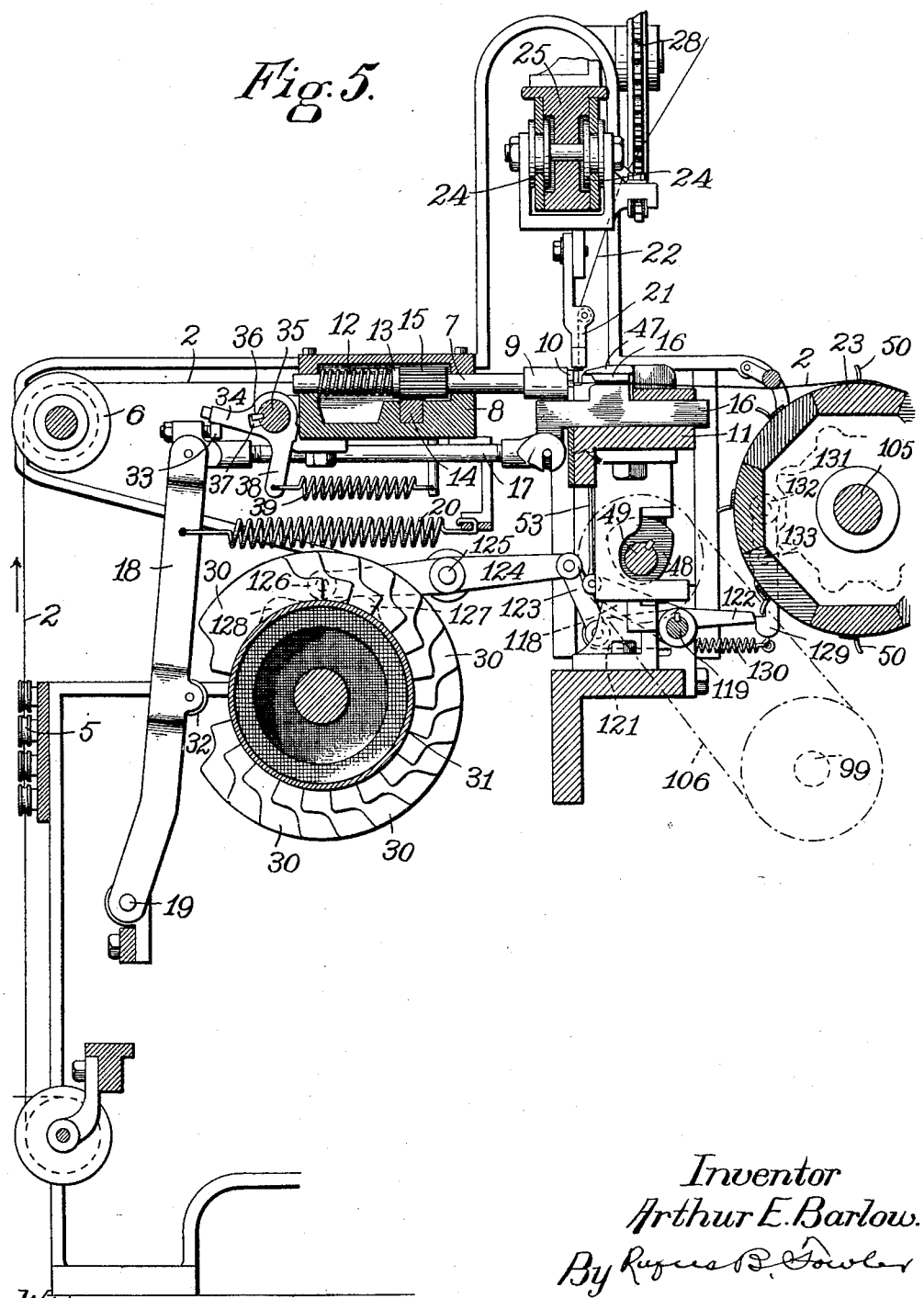
Figure 11:
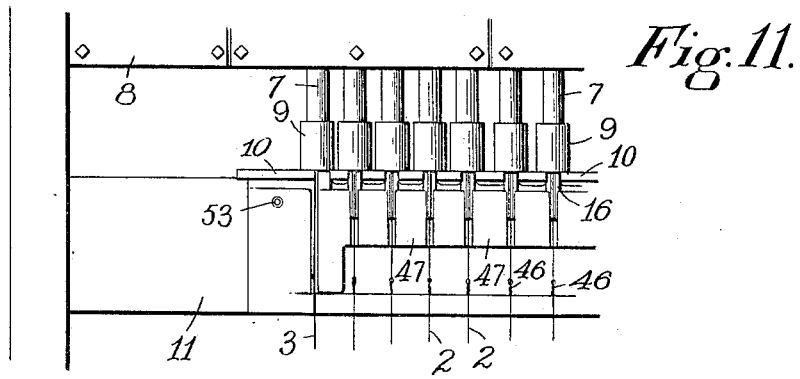
Figure 12:
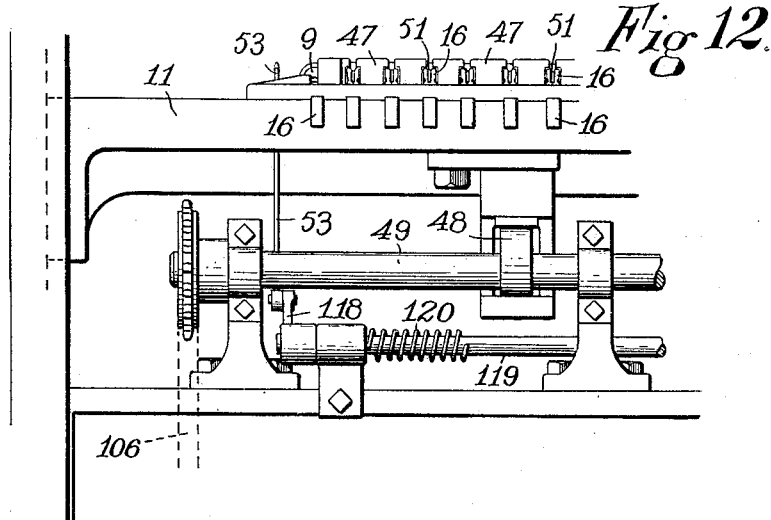
Figure 21:
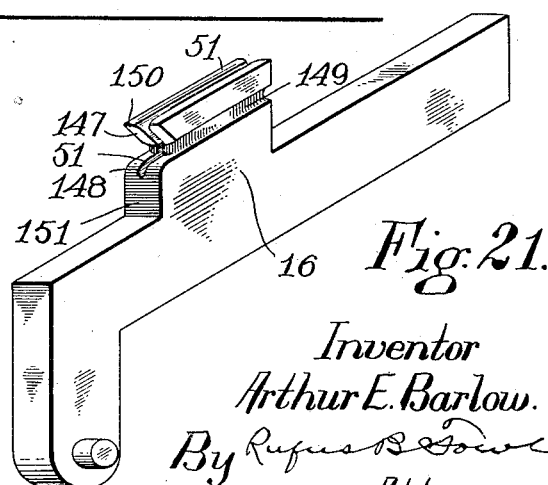
Figure 18:
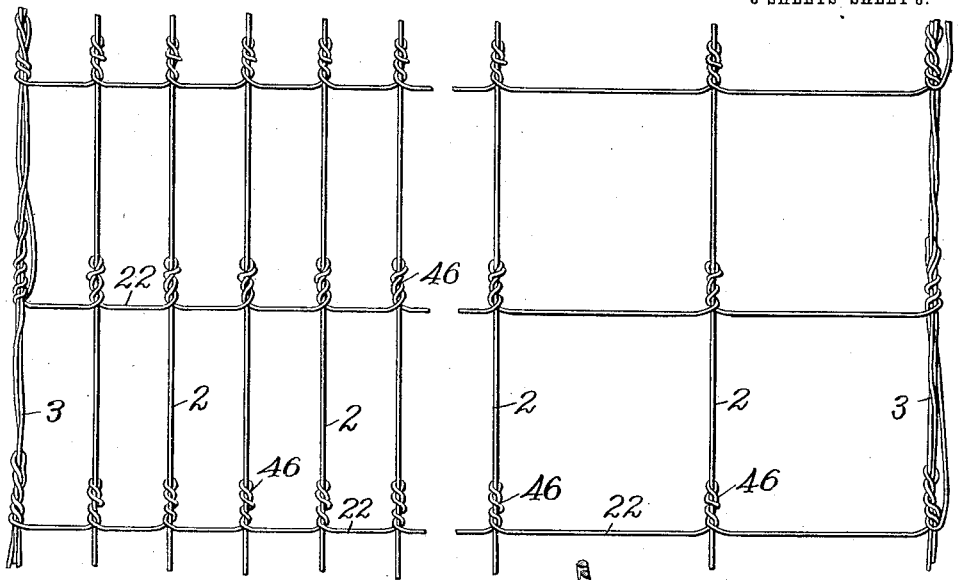
Figure 17:
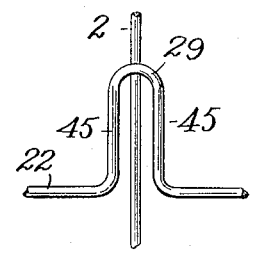
Figure 20:
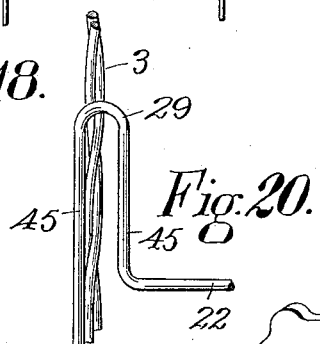
Figure 19:
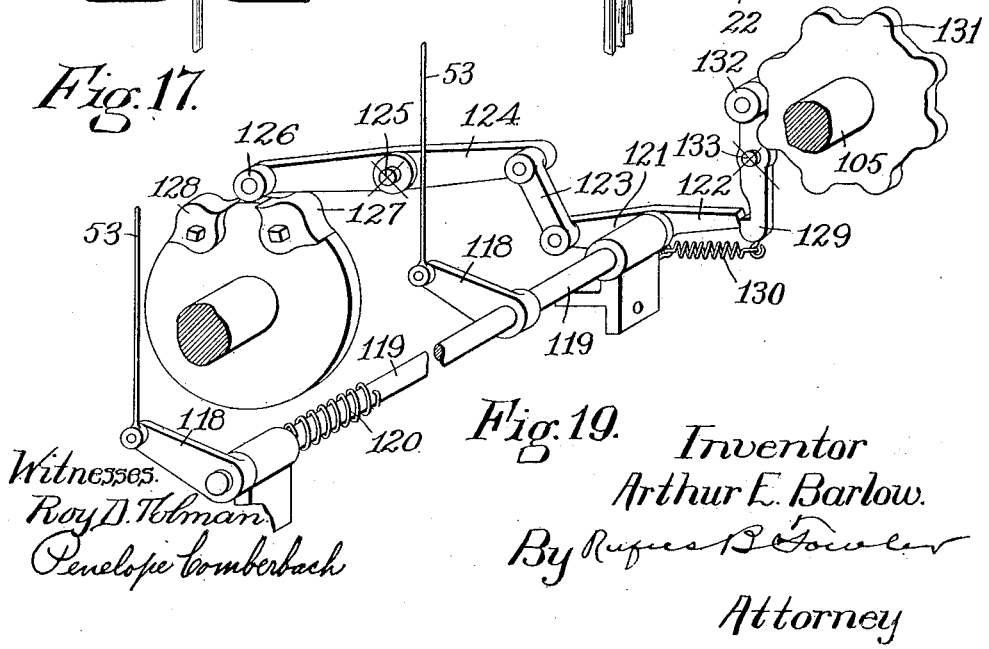

In the accompanying drawings, Figure 1 represents a plan view of a machine embodying my invention. Fig. 2 is a front view of the same. Fig. 3 is a front elevation of a portion of the actuating mechanism shown in sectional view on the plane of the broken line 3—3, Fig. 1. Fig. 4 represents in rear elevation a portion of the actuating mechanism shown in sectional view on the plane of the broken line 4—4, Fig. 1. Fig. 5 is a transverse sectional view on the vertical plane of one of the twisting heads, illustrating the construction and operation of the loop forming and twisting mechanisms. Figs. 6, 7 and 8 are similar sectional views to that shown in Fig. 5, but showing the loop forming and twisting mechanisms in different positions assumed during the operation of forming and twisting a loop of the stay wire. Figs. 9, 10 and 11 are plan views of a portion of the loop forming and twisting mechanisms, shown in different positions in the different figures. Fig. 12 is a front view of the loop forming and twisting mechanisms shown in Fig. 11. Fig. 13 is a horizontal sectional view through the twisting head and loop forming jaw, showing the latter in the position of forming the loop in the stay wire. Fig. 14 is a sectional view of the same, showing the twisting head advanced to inclose the loop. Fig. 15 is an end view of one of the twisting heads. Fig. 16 is a detached view of a pair of the actuating gears and stop motion comprised in the take-up mechanism. Fig. 17 is a detached view of one of the loops in the stay wire, showing its relation to the strand wire before twisting. Fig. 18 represents a portion of the completed fabric. Fig. 19 is a detached view of the mechanism for operating the vertically movable rods for taking up the stay wire. Fig. 20 is a detached view of one of the loops in the stay wire formed at the edges of the fabric and showing its relation to the selvage wires before twisting. Fig. 21 is a detached perspective view, on a larger scale, of one of the loop forming jaws.

Similar reference characters refer to similar parts in the different figures.

Referring to the accompanying drawings, 1, 1 denote two end frames connected by suitable girths and between which are mounted means for supporting a series of strand wires 2, 2, the outer wires of which are preferably doubled to form the selvage wires 3, 3, and mechanisms for laying a stay wire transversely to the strand wires, for forming loops in the stay wire; for twisting the same around the strand wires and for intermittently taking up the completed fabric. Between one of the end frames and a supplemental frame 4 I support a system of gearing for actuating the several mechanisms which operate directly upon the wire in forming the fabric, said mechanisms being represented upon a larger scale in Fig. 5 which represents the fabric forming mechanism in connection with one of the strand wires 2. The strand wire 2, after passing through a series of straightening rolls 5 and over a whip roll 6, is conducted through a hollow spindle 7 which is journaled in a cross beam 8. The hollow spindle 7 carries upon one end a twisting head 9 which is normally held against a vertical plate 10 supported upon a cross beam 11 by means of a spiral spring 12, which is inclosed in a recess in the cross beam 8, between the end wall of the recess and a collar 13 attached to the hollow spindle 7. At the proper period in the operation of the machine, rotary motion is imparted to the twisting head 9 by means of a reciprocating rack bar 14, sliding in ways in the beam 8 and engaging a pinion 15 attached to the spindle 7.

In front of the plate 10 is a loop forming jaw 16, sliding in ways in the beam 11 and pivotally connected by means of a link 17 with a rocking lever 18 pivoted at its lower end at 19 to the framework of the machine. The lever 18 is connected with a fixed part of the framework by means of a spring 20, the tension of which serves to normally hold the lever 18 in its forward position, as shown in Fig. 5, to maintain the loop forming jaw 16 a short distance in front of the plate 10 to allow a traversing carrier 21 to lay the stay wire 22 upon the strand wires 2 between the loop forming jaw 16 and the plate 10. The strand wires 2 pass through the plate 10 and through a slot in the loop forming jaw 16 to a takeup roll 23. The carrier 21 for the stay wire travels in ways 24, 24 in an overhead beam 25 supported upon the end frames 1. A back and forth traversing movement is imparted to the carrier 21 by means of an endless chain 26 carried upon sprocket wheels 27, 28 and attached to the carrier 21. The stay wire 22 taken from an overhead spool, not shown, passes through the carrier 21 by which it is laid upon the strand wires 2 when the loop forming and twisting mechanisms are in the position shown in Fig. 5. The loop forming jaws 16 are then drawn back through notches in the plate 10, pushing the twisting heads 9 into the position shown in Fig. 6, compressing the spring 12 and forming a loop 29 around the jaw 16, as shown in Fig. 13. This movement of the looping jaws is accomplished by means of cam plates 30 carried upon a cylinder 31 and acting against cam rolls 32 carried by the pivoted levers 18.

The cylinder 31 is provided with a cam plate 30 for each one of the levers 18, and they are arranged upon the cylinder 31 so as to act consecutively upon the levers forcing back one lever after another from one side of the machine to the other, the movement of the levers following the passage of the carrier 21 across the strand wires. As each of the cam plates 30 passes the rolls 32, their respective levers are again drawn forward by the tension of the spiral springs 20, allowing the loop forming jaws 16 to pass from the position shown in Fig. 6 into the position shown in Fig. 7. In the position of the parts shown in Fig. 7, the twisting head 9 is brought against the vertical plate 10 by the tension of the spiral spring 12, and the loop forming jaw 16, still in contact with the twisting head 9, is held from further forward movement by the contact of a screw 33, carried in the upper end of the lever 18, with a latch 34 held loosely upon an oscillating shaft 35. The shaft 35 is provided with a spline 36 which enters a recess 37 in the latch 34, said recess being wide enough to permit a slight rocking movement of the latch 34 on the oscillating shaft 35. An arm 38 projects from the under side of the latch and is connected by a spiral spring 39 with a fixed stud 40 held in the under side of the beam 8.

The position of the twisting and loop forming members shown in elevation in Fig. 6 is represented on a larger scale in sectional plan view in Fig. 13. The position of the twisting and loop forming members shown in elevation in Fig. 7 is represented on a larger scale in sectional plan view in Fig. 14. The loop 29, formed by the rearward movement of the jaw 16 through the plate 10, is represented in Fig. 14 as inclosed in a diametrical slot 42 formed in a hardened steel bushing 43 held in the twisting head 9 by means of a set screw 44. After the carrier 21 has passed transversely across the strand wires and the series of loops have been successively formed and inclosed in the twisting heads in the position shown in Fig. 14, a reciprocating motion is given to the rack bar 14 which rotates all the twisting heads 9 to carry the two parallel sides 45, 45 of the loops 29 around the strand wires 2. A sufficient number of rotations is given to the twisting heads to cause the loops to be thoroughly twisted around the strand wire, as shown at 46, Fig. 18. As the twisting head 9 is rotated, in the manner above described, the parallel sides 45 of the loop contained within the slot 42 are carried around in a common circular path, being maintained 180° apart. The twisting of the wire, due to the rotation of the head 9, results in a longitudinal shortening of the loop 29, the crown of which gradually moves inwardly, in the direction of the open end of the loop, in response to such shortening. When the twisting operation has been completed, the oscillating shaft 35 is rocked to raise the latch 34 from the position shown in Figs. 6 and 7 to the position shown in Fig. 5, which releases the lever 18 and allows the tension of the spring 20 to move the loop forming jaw still farther forward from the position shown in Fig. 7 to the position shown in Fig. 5, thereby providing sufficient space between the loop forming jaw 16 and the plate 10 to allow the carrier 21 on its return movement to lay another stay wire upon the series of strand wires.

The several sliding loop forming jaws 16 are held in ways in the beam 11, to which are attached plates which extend over the normal position of the loop forming jaws 16 forming covers 47. The beam 11 is capable of sliding vertically in ways upon the end frames 1, 1 and is supported at each end upon cams, one of which is shown at 48, Fig.

5. The cams 48, in the position shown in Fig. 5, support the beam 11 with its loop forming jaws 16 in a raised position, but after the operation of twisting has been performed, a shaft 49, to which the cams 48 are attached, is rocked, bringing the cams into the position shown in Fig. 8 and allowing the beam 11 to descend to bring the covers 47 below the plane of the strand wires 2, as shown in Fig. 8, to allow the stay wire, which has just been united to the strand wires by its twisted connections, to pass over the covers 47 as the fabric is taken up by an intermittent movement imparted to the takeup roll 23. The cams 48 are then rotated to raise the loop forming jaws 16 into their normal position, as shown in Fig. 5, when the traversing movement of the carrier 21 is reversed and the levers 18, beginning at the opposite side of the machine, are consecutively moved back by a reverse movement of the cam carrying cylinder 31.

The takeup roll 23 is provided with spurs 50 projecting from its periphery, which engage the stay wires to take up the completed fabric and draw the strand wires 2 through the hollow spindles 7 and slots 51 in the loop forming jaws 16. As the completed fabric is taken up by the intermittent movement of the takeup roll 23, it is wound upon a winding roll 52. The strand wires are spaced to correspond with the desired vertical height of the meshes in the completed fabric. In the present instance the strand wires are nearer together upon one side of the fabric than upon the other, as shown in Figs. 1 and 2, in which the strand wires are nearer together upon the left hand side of the figures, or upon that side of the fabric which is designed to be placed nearest the ground when used as a fence. The horizontal size of the meshes is determined by the extent of movement of the takeup roll 23. As the direction of the movement of the carrier 21 is changed at each end of its traversing movement, the stay wire 22 is carried around the upper end of a vertical sliding rod 53, one of which is shown at the left-hand side of the machine in Fig. 12, which rods normally project above the top of the beam 11. The passage of the stay wire around the rod 53 provides a surplus length of stay wire which is taken up by the forward movement of the first loop forming jaw 16. When the carrier 21 has reached a position past the first few twisting heads, as shown in Fig. 9, the vertical sliding rod 53 is depressed to release the stay wire and allow the slack, shown at 54, Fig. 9, to be drawn taut and parallel with the sides of the selvage wire 3 by the formation of the loop formed by the sliding movement of the first loop forming jaw 16.

In plan view in Fig. 9 all the twisting heads there represented are shown as being held against the vertical plate 10, with the loop forming jaws 16 drawn forward beneath the covers 47 and corresponding to the position shown in elevation in Fig. 5. The carrier 21 in Fig. 9 is represented as having just begun its traversing movement toward the right and having laid the stay wire upon the strand wires in front of the first three twisting heads upon the left-hand side of the machine, with the stay wire carried around the vertical rod 53 to furnish an extra length of stay wire at 54 sufficient for the formation of the first loop.

In Fig. 10 the carrier 21 has advanced to the right and laid the stay wire in front of the first seven twisting heads at the left side of the machine. The rod 53 is there shown as depressed, which has released the stay wire. All the loop forming jaws shown in Fig. 10 have been moved rearwardly through notches in the plate 10 into the position shown in Fig. 6, in order to form loops in the stay wire. The first two twisting heads $9^a$ are represented as having been returned into contact with the vertical plate 10, said heads $9^a$ and their corresponding loop forming jaws being in positions corresponding to those shown in elevation in Fig. 7. The third twisting head $9^b$ is represented as partially returned, while the remaining four twisting heads $9^c$ and their loop forming jaws are still in the position shown in elevation in Fig. 6.

In Fig. 11 the twisting heads and loop forming jaws are all shown in the position represented in Fig. 7, or in the position in which the twisting heads are rotated for the purpose of twisting the loops 29 around the strand wires, which is accomplished by the sliding movement of the rack-bar 14. The rack-bar 14 is moved in one direction for twisting one set of loops and in the opposite direction for twisting the next succeeding set of loops.

The proper movements are imparted to the different elements directly concerned in the manufacture of the fabric as above described by means of power applied to a pulley 55 on the short countershaft 56. The rotary motion of the shaft 56 is applied through the beveled pinion 57, bevel gear 58, intermediate shaft 59 and spur gears 60 and 61 to the main driving shaft 62. To one end of the main shaft 62 is attached a segmental gear 63, Fig. 2, engaging a segmental gear 64 attached to a shaft 65, upon which are journaled loosely the bevel gears 66 and 67 connected by a miter gear 68 rotating loosely upon a stud 69 held in the frame 4. The hubs of the bevel gears 66 and 67 are provided with clutch teeth adapted to be engaged by a sliding clutch collar 70 having a spline connection with the shaft 65. Upon the hub of the bevel gear 67 I attach a sprocket wheel 71 connected by a chain belt 72 with a sprocket wheel 73 attached to the hub of the sprocket wheel 27. The rotary motion of the shaft 65 is imparted in the same direction to the bevel gear 67 and the sprocket wheel 71 when the clutch collar 70 engages the hub of the bevel gear 67, as shown in plan view in Fig. 1. When the clutch collar 70 is shifted to engage the hub of the bevel gear 66, the shaft 65 will rotate the bevel gear 67 and sprocket wheel 71 in the opposite direction through the miter gear 68. Movement is thereby imparted to the sprocket wheels 27 and 28 in opposite directions to move the stay wire carrier 21 back and forth across the strand wires. The shaft 65 is rotated intermittently by the engagement of the segmental gears 63 and 64, and during the period of rest of the shaft 65 it is locked from movement by means of the broad tooth 74 riding upon the plain periphery 75 of the segmental gear 63, forming what is known as a Geneva stop motion. The clutch collar 70 is shifted to alternately engage the bevel gears 66 and 67 by means of a shipping lever 76 pivoted at its lower end to a fixed stud 76ª, held in the frame 4 and actuated by a cam 77 engaging a cam roll 78 on the lever 76 and rotated from the main shaft 62 by the gears 79 and 80, Fig. 3.

Attached to the main shaft 62 is a spur gear 81, which engages a gear 82 on a shaft 83 to which a cam 84 is attached. The cam 84 acts against cam rolls 85 and 86 placed upon diametrically opposite sides to impart a reciprocating motion to a bar 87, which is connected by a link 88 to one end of a rocking lever 89. The rocking lever 89 is provided at its opposite end with a segmental rack 90, which engages the rack 14 by which the twisting heads 9 are rotated. The main shaft 62 also imparts an intermittent motion to a shaft 91 by means of a pair of segmental gears 92 and 93 which are shown detached in Fig. 16. The driven gear 93 is provided with locking teeth 94 and 95, by which the gear is held from rotation during the passage past them of the plain periphery 96 of the driving gear 92 forming a Geneva stop motion, by which the shaft 91 is locked between its intermittent motions. The shaft 91 is connected by the bevel gears 97 and 98 with a short shaft 99, which carries a cam 100 acting upon the cam rolls 101 and 102 to actuate a rack 103. The rack 103 engages a pinion 104, which is connected by a pawl and ratchet mechanism with a shaft 105 upon which the takeup roll 23 is mounted. The short shaft 99 is connected by a chain belt 106 with the shaft 49 upon which the cams 48 are carried. The intermittent motion transmitted through the segmental gears 92 and 93 is imparted to the takeup roll 23 and also to the cams 48 to cause the beam 11 to be depressed and allow the completed fabric to pass over the covers 47.

The mechanism already described for imparting a traversing motion to the stay wire carrier 21, comprising the segmental gears 63 and 64, bevel gears 66 and 67 with the sliding clutch collar 70, is duplicated in the segmental gears 107 and 108 and bevel gears 109 and 110 turning loosely on the shaft 111 and alternately connected therewith by means of a sliding clutch collar 112, by which an intermittent motion in opposite directions is imparted to the cam cylinder 31 by means of an intermediate bevel gear 113. The main shaft 62 carries a cam 114 which actuates a rocking lever 115 connected by a link 116 with a radial arm 117 on the end of the rocking shaft 35, to impart a motion to the shaft at the proper period to cause its spline 36 to raise the latches 34 into the position shown in Fig. 5 and, at the proper period, to allow the latches to be depressed by the spiral springs 39 into the position shown in Figs. 6 and 7.

The rising and falling motions of the rods 53, by which a portion of the stay wire is taken up at each end of the traversing movement of the carrier 21, as already described, is accomplished by mechanism illustrated in Fig. 5 and more clearly in Fig. 19. The lower ends of the rods 53 are pivoted to the free ends of radial arms 118 carried upon a rock shaft 119, to which a torsional spring 120 is applied to rock the shaft 119 and hold the rods 53 normally in their raised position. Attached to the rocking shaft 119 are radial arms 121 and 122. The free end of the arm 121 is connected by a link 123 with one end of a rocking lever 124, pivoted midway its length at 125 and provided at its opposite end with a cam roll 126 which, at the proper period, is acted upon by the cam teeth 127 and 128 upon the shaft of the cam cylinder 31, the tooth 127 rocking the lever when the cylinder is rotated in one direction and the tooth 128 rocking the lever when the cylinder is rotated in the opposite direction. The rocking of the lever 124 by either of the cam teeth 127 or 128 depresses the arm 121 to rock the shaft 119 and depress the rods 53 below the top of the beam 11, so as to release the stay wire which had previously been carried around the rod, as shown at 54 in Fig. 9. As the rods 53 are depressed, the arm 122 is raised and a hooked latch 129 is carried beneath the end of the arm 122 by the tension of a spiral spring 130, thereby locking the rocking shaft 119 against the tension of the torsional spring 120. The locking of the shaft 119 by the latch 129 prevents the rods 53 from being raised until the latch 129 is released, which is accomplished by means of the cam teeth 131 carried on the shaft 105 of the takeup roll 23 acting against a cam roll 132, which is carried by the upper end of the hooked latch 129, causing the latch to be rocked on its pivot 133 against the tension of the spiral spring 130.

The shaft 105 of the takeup roll 23 is connected with the driving power by a clutch 135, which is normally held in engagement by a spring 136 acting upon a shipping lever 137. The lever 137 can be rocked to disengage the clutch by means of a foot treadle, thereby disconnecting the takeup roll 23 and at the same time allowing the other operations of the machine to be carried on, when necessary for any reason, such as the replacement of a broken stay wire. Motion is imparted to the winding roll 52 from the shaft 105 of the takeup roll by means of gears 139 and a chain belt 140 carried upon sprocket wheels 141 and 142. The sprocket wheel 142 is loose upon the shaft 105, but its web is clamped between a disk 143 attached to the shaft 105 and a slidable disk 144 having a spline connection with the shaft 105. The disk 144 is pressed against the web of the sprocket wheel 142 by a spiral spring 145, forming a friction clutch of just sufficient power to actuate the winding roll 52 to take up the slack in the completed fabric as it is delivered by the takeup roll 23. The power of the friction clutch is adjusted by means of a nut engaging the screw threaded end of the shaft 105 and provided with a hand wheel 146.

The operations of forming and twisting the loops in the stay wire is the same for the strand wires 2, 2 and the selvage wires 3, 3, but the strand wires 2 pass through the slots 51 in the center of the loop forming jaws 16 bringing them in the center of the loops 29, as shown in Fig. 17, while the selvage wires 3 pass outside the loop forming jaws 16 bringing them at one side of the loops 29, as shown in Fig. 20.

The slidable loop forming jaw 16, which is shown in perspective on a larger scale in Fig. 21, is provided with a hooked face 147 under which the stay wire is caught as the jaw is moved against it. The crown portion of the loop is formed around the rounded surface 148 while the sides of the loop are held in the side grooves 149. The loop is thereby held in alinement with the diametrical slot 42 of the twisting head 9. As the jaw is retracted after the formation of a loop, the twisting head 9 is held in contact with the tip 150 of the hooked face of the jaw and also with the shoulder 151 by the spring 12, which advances the twisting head as fast as the jaw 16 is retracted, thereby securely transferring the loop from the jaws, and means for successively moving relation of the twisting head 9 and jaw 16 is maintained by means of the latch 34 until after the heads 9 have been rotated to twist the loops around the strand wires.

I claim,

1. In a wire fabric machine, means for supporting a series of strand wires in the same plane, means for laying a stay wire transversely to said strand wires, means for forming U-shaped loops in said stay wire to correspond with each strand wire, and means for bodily rotating each of said loops about an axis coincident with the axis of the corresponding strand wire, and parallel with the sides of said loop.

2. In a wire fabric machine, means for supporting a series of strand wires in a horizontal plane, means for laying a stay wire transversely to the strand wires and supported thereon, means for successively forming U-shaped loops in the stay wire, with the crown of each loop resting upon its corresponding strand wire and with the sides of the loops parallel with and on opposite sides of the strand wire, and means for rotating the sides of the loops about axes corresponding with the axes of the strand wires, with the crowns of the loops still resting on the strand wire.

3. In a wire fabric machine, means for supporting a series of strand wires in the same plane, means for laying a stay wire transversely to said strand wires, means for forming U-shaped loops in said stay wire opposite each strand wire, means for holding the sides of said loop 180° apart, and means for rotating said holding means about an axis parallel to and intermediate said sides.

4. In a wire fabric machine, means for supporting a series of strand wires in a common plane, means for laying a stay wire transversely to said strand wires, means for forming a U-shaped loop in said stay wire opposite each strand wire, and means for bodily rotating the sides of each loop in a common circular path about an axis parallel to said sides.

5. In a wire fabric machine, means for supporting a series of strand wires in the same plane, means for laying a stay wire transversely across the strand wires, a notched plate parallel with said stay wire, with the strand wires passing through its notches, a series of slidable loop forming jaws, and means for successively moving said jaws through said notched plate.

6. In a wire fabric machine, means for supporting a series of strand wires in the same plane, a notched plate at right angles with the strand wires, with the strand wires passing through its notches, a series of slidable loop forming jaws, means for laying a stay wire across the strand wires between said jaws and said notched plate, and means for successively moving said jaws through the notches in said plate.

7. In a wire fabric machine, a notched plate, means for supporting a series of strand wires at right angles to said plate and passing through the notches thereof, a series of loop forming jaws in a row spaced from said plate and having slots for the strand wires, and means for moving said jaws through the notches in said plate.

8. In a wire fabric machine, a notched plate, a row of loop forming jaws spaced from said plate and provided with slots for the passage of strand wires, means for moving said jaws through the notches in said plate, and means for laying a stay wire in the space between the loop forming jaws and the notched plate.

9. In a wire fabric machine, means for supporting a series of strand wires in a horizontal plane, a plate at right angles to the strand wires having notches for the passage of the strand wires therethrough, means for laying a stay wire across the strand wires in front of said notched plate, and means for pushing the stay wire through the notches of said plate to form a series of loops therein.

10. In a wire fabric machine, means for supporting a series of strand wires in a horizontal plane, a notched plate at right angles to the strand wires, slidable jaws spaced from said notched plate and having slots for the passage of the strand wires, means for laying a stay wire in the space between said jaws and said notched plate, and means for moving said jaws through the notched plate.

11. In a wire fabric machine, means for supporting a series of strand wires in substantially a horizontal plane, a notched plate at right angles to the strand wires, slidable jaws spaced from said notched plate and having slots for the strand wires, means for laying a stay wire between the notched plate and the slidable jaws, and means for imparting a sliding movement to said jaws successively from one side of the machine to the other.

12. In a wire fabric machine, means for supporting a series of strand wires, a notched plate at right angles thereto, a series of jaws spaced from said plate, means for placing a stay wire between said jaws and said plate, and means for moving said jaws through the notches of said plate progressively from one side of the machine to the other.

13. In a wire fabric machine, means for supporting a series of strand wires, a notched plate at right angles to the strand wires, jaws spaced from said notched plates, a carrier for a stay wire, means for traversing said carrier across the strand wires alternately in opposite directions, and means for moving said jaws through said notched plate progressively from one side of the machine to the other following the movement of said carrier.

14. In a wire fabric machine, means for supporting a series of strand wires, a notched plate at right angles to the strand wires, a series of jaws spaced from said plate, means for traversing a carrier for a stay wire across the strand wires alternately in opposite directions, a cam cylinder having a series of cam plates operatively connected with said jaws and arranged on said cylinder to move said jaws progressively from one side of the machine to the other following the movement of said carrier, and means for reversing the motion of said cam cylinder.

15. In a wire fabric machine, means for supporting a series of strand wires, a notched plate at right angles to the strand wires, means for laying a stay wire parallel to said notched plate, means for forming a series of loops in the stay wire projecting through said notched plate, a series of twisting heads having diametrical slots to receive the loops of the stay wire, means for moving said twisting heads longitudinally toward said notched plate to inclose said loops, and means for rotating said twisting heads.

16. In a wire fabric machine, means for supporting a series of strand wires, means for laying a stay wire transversely to the strand wires, means for forming U-shaped loops in the stay wire where it crosses the strand wires, with the crowns of the loops passing across the strand wires, twisting heads having diametrical slots, means for moving said twisting heads longitudinally over the crowns to inclose the sides of said loops, and means for rotating said twisting heads.

17. In a wire fabric machine, means for supporting a series of strand wires, means for laying a stay wire across the strand wires, means for forming a series of U-shaped loops in the stay wire corresponding in position with the strand wires, a series of twisting heads, means for moving said twisting heads longitudinally over the crowns of said loops to inclose said loops, and means for rotating said twisting heads.

18. In a wire fabric machine, means for supporting a series of strand wires, means for laying a stay wire transversely to the strand wires, a series of slidable loop forming jaws inclosing each of the strand wires, means for progressively moving said jaws to form U-shaped loops, means for withdrawing the jaws from the loops, a series of twisting heads having diametrical slots, means for moving said twisting heads longitudinally to inclose said loops, and means for rotating said twisting heads.

19. In a wire fabric machine, means for supporting a series of strand wires, means for laying a stay wire transversely across the strand wires, means for progresisvely forming a series of U-shaped loops in the stay wire from one side of the machine to the other, means for twisting the loops around the stay wires, and means for longitudinally moving the strand wires to withdraw the twisted loops from the twisting means.

20. In a wire fabric machine, a series of rotatable twisting heads having diametrical slots for receiving the loops in a stay wire, a notched plate, springs having their tension applied to hold the twisting heads yieldingly against said notched plate, slidable means for pushing the stay wire through the notches of said plate and retracting said twisting heads to form loops in the stay wire, and means for reversing the movement of said slidable loop forming mechanisms and releasing said twisting heads.

21. In a wire fabric machine, means for supporting a series of strand wires, means for laying a stay wire across the strand wires, a transverse notched plate inclosing the strand wires in its notches, slidable loop forming mechanisms for pushing the stay wire through the notches of said plate, hollow spindles inclosing the strand wires, twisting heads carried by said spindles and adapted to engage the loops in the stay wire, yielding means for holding said twisting heads normally against said notched plate, and means for rotating said twisting heads.

22. In a wire fabric machine, means for supporting a series of strand wires, means for laying a continuous stay wire transversely across the strand wires alternately in opposite directions, means for uniting the stay wire to each of the strand wires, and means for taking up a portion of the stay wire at each reversal of its movement across the strand wires.

23. In a wire fabric machine, means for supporting a series of strand wires, a carrier for laying a stay wire transversely across the strand wires, means for reversing the movement of said carrier, and means for taking up a portion of the stay wire at the beginning of each movement of said carrier across the strand wires.

24. In a wire fabric machine, means for supporting a series of strand wires, means for laying a stay wire across the strand wires, means for progressively forming a series of loops in the stay wire from one side of the machine to the other, and means for providing a slack in the stay wire in advance of the formation of the first loop in each of said series of loops.

25. In a wire fabric machine, means for supporting a series of strand wires in a horizontal plane, means for laying a continuous stay wire across the strand wires alternately in opposite directions, means for progressively forming a series of loops in the stay wire alternately from one side of the machine to the other, a takeup pin at each side of the series of strand wires, means for interposing said pins in the path of the stay wire, and means for withdrawing said pins after the passage of the stay wire.

26. In a wire fabric machine, means for supporting a series of strand wires, means for laying a continuous stay wire across the strand wires alternately in opposite directions, a takeup roll for moving the strand wires, pins for taking up the stay wire at the beginning of its movement across the strand wires, means for normally holding said pins in the path of the stay wire, means for withdrawing said pins after the passage of the stay wire, means for locking said pins in their withdrawn position, and means for releasing the locking means controlled by the movement of the takeup roll.

27. In a wire fabric machine, means for forming a U-shaped loop in a transverse stay wire, comprising a slidable jaw having a hooked face to engage the stay wire with a rounded surface to form the crown portion of the loop, and provided with side grooves to receive the sides of the loop.

28. In a wire fabric machine, a transverse beam vertically movable, a series of slidable loop forming jaws supported on said beam, covers for said jaws, and means for lowering said beam to bring said covers below the plane of the completed fabric.

29. In a wire fabric machine, means for supporting a series of strand wires, means for laying a stay wire across said strand wires, a series of loop forming mechanisms for forming loops in the stay wires, means for holding said mechanisms normally in the plane of the stay wire, and means for depressing said loop forming mechanisms below the plane of the stay wire.

30. In a wire fabric machine, means for supporting a series of strand wires in a horizontal plane, means for laying a stay wire across the strand wires, mechanism for forming loops in the stay wire, means for twisting the loops about the strand wires, means for maintaining the loop forming mechanism in a raised position during the formation of the loops, and means for depressing the loop forming mechanism after the operation of twisting.

31. In a wire fabric machine, means for supporting a series of strand wires in a horizontal plane, means for laying a stay wire across said strand wires, mechanism for forming a series of loops in the stay wire, means for twisting the loops about the strand wires, means for maintaining the loop forming mechanism in a raised position during the operation of forming the loops, means for depressing the loop forming mechanism after the operation of twisting, and means for moving the strand wires forward.

32. In a wire fabric machine, means for supporting a series of strand wires, a notched plate held transversely to the strand wires, a series of slidable loop forming jaws spaced from said notched plate, a reciprocating carrier for a stay wire above the space between said jaws and said notched plate, and actuating means for said carrier, comprising an endless chain attached to the carrier, sprocket wheels for said chain, a driving shaft, connecting mechanism between said driving shaft and said sprocket wheels for rotating the latter alternately in opposite directions and locking the same between each movement.

33. In a wire fabric machine, means for supporting a series of strand wires in a horizontal position, means for laying a stay wire transversely to the strand wires, means for forming loops in the stay wire, means for twisting said loops about the strand wires, means for moving the strand wires forward, a rotating driving shaft, and connecting intermediate mechanism for actuating said operative means intermittently and locking the same between each movement.

34. In a wire fabric machine, means for supporting a series of strand wires, a plate held transversely to the strand wires, a series of twisting heads yieldingly held against one side of said plate, a series of slidable loop forming jaws normally spaced from the opposite of said plate, means for moving said jaws to push said twisting heads away from said plate, means for partially retracting said jaws to return said twisting heads against said plate, means for rotating said twisting heads, and means for returning said jaws to their normal position.

35. In a wire fabric machine, means for supporting a series of strand wires, a notched plate held transversely to the strand wires, a series of slidable jaws, means for progressively sliding said jaws, comprising a series of pivoted levers, links pivotally connecting said levers with said jaws, a rotating cam cylinder having a series of cam plates arranged to progressively act upon said levers from one side of the machine to the other.

36. In a wire fabric machine, means for supporting a series of strand wires, a notched plate, held transversely to the strand wires, a series of slidable jaws, means for actuating said jaws, comprising a series of pivoted levers, links connecting said levers and said jaws, a rotating cam cylinder having a series of cam plates arranged to act progressively upon said levers from one side of the machine to the other, and a series of springs applied to retract said jaws as they are released by said cam plates.

37. In a wire fabric machine, means for supporting a series of strand wires, a notched plate, held transversely to the strand wires, a series of slidable jaws, means for actuating said jaws, comprising a series of pivoted levers, links connecting said levers and said jaws, a rotatable cam cylinder having a series of cam plates arranged to progressively act upon said levers, means for rotating said cam cylinder in one direction to progressively actuate said jaws from one side of the machine to the other, means for reversing the rotation of said cam cylinder to progressively actuate said jaws from the opposite side of the machine, and springs for reversing the sliding movement of said jaws.

38. In a wire fabric machine, a series of slidable jaws for forming loops in a stay wire, means for actuating said jaws, comprising a series of pivoted levers operatively connected with said jaws, cams acting against said levers to slide said jaws, springs for reversing the movement of said jaws, means for limiting the partial reversal of said jaws, and means for releasing said limiting means.

39. In a wire fabric machine, a series of slidable jaws, pivoted levers operatively connected with said jaws, cams for actuating said levers, springs for reversing the movement of said levers, latches interposed in the path of said levers to limit their partial reversal, and means for removing said latches from the path of the levers.

40. In a wire fabric machine, a series of slidable jaws, levers operatively connected with said jaws, cams for moving said levers in one direction, springs for reversing the levers, latches arranged to be interposed in the paths of said levers to limit their movement, a rocking shaft on which said levers are pivotally supported, and means carried by said shaft for simultaneously moving said latches out of the paths of the levers.

41. In a wire fabric machine, means for supporting a series of strand wires, a series of rotatable hollow spindles inclosing the strand wires and capable of sliding longitudinally in their bearings, pinions carried by said spindles, a sliding rack engaging said pinions, a rocking segmental rack engaging said sliding rack, springs for moving said spindles longitudinally in one direction, means for limiting the movement of said spindles as actuated by said springs, means for moving said spindles against the tension of said springs, and twisting heads carried by said spindles.

42. In a wire fabric machine, means for supporting a series of strand wires, means for laying a stay wire across the strand wires, a series of hollow spindles inclosing the strand wires, twisting heads having diametrical slots to receive the loops of the stay wire, means for forming loops in the stay wire, comprising a slidable loop forming jaw having a longitudinal slot to receive a strand wire, a hooked face to pass over the stay wire and side grooves to receive the sides of the loop, and means for moving said jaw against a twisting head to impart a longitudinal movement thereto.

43. In a wire fabric machine, means for supporting a series of strand wires, a plate held transversely to the strand wires having notches inclosing the strand wires, a series of twisting heads having diametrical slots to receive loops in the stay wire, means for holding said twisting heads yieldingly against said notched plate, slidable jaws spaced from the opposite of said notched plate, means for sliding said jaws to move the twisting heads away from said notched plate, means for retracting said jaws, means for rotating said twisting heads, means for depressing said jaws, and means engaging the meshes of the fabric for moving the strand wires longitudinally.

44. In a wire fabric machine, means for supporting a series of strand wires, means for laying a stay wire across the strand wires, means for forming loops in the stay wire, means for twisting the loops around the strand wires, means engaging the meshes of the fabric for moving the strand wires longitudinally, a winding roll, means for frictionally imparting a rotary motion to said winding roll, and means for depressing a portion of the loop forming mechanism during each movement of the winding roll.

45. In a wire fabric machine, means through which the strand-wires are threaded, in connection with a rotatable endwise movable twisting-head, across the bore of which a stay-wire is passed and into which a portion of the latter is looped adjacent to the strand-wire by the means through which the latter is threaded, following which a rotation of the twisting means causes the sides of the loop formed to successively follow each other around the strand-wire in the formation of a joint at the intersection of the wires.

Dated this twenty-seventh day of February 1911.

ARTHUR E. BARLOW.

Witnesses:
PENELOPE COMBERBACH,
NELLIE WHALEN.

Copies of this patent may be obtained for five cents each, by addressing the "Commissioner of Patents, Washington, D. C."

Correction in Letters Patent No. 1,109,563.

It is hereby certified that in Letters Patent No. 1,109,563, granted September 1, 1914, upon the application of Arthur E. Barlow, of Worcester, Massachusetts, for an improvement in "Machines for Making Wire Fabric," an error appears in the printed specification requiring correction as follows: Page 5, line 61, for the words "jaws, and means for successively moving" read *jaw to the twisting head. The contactual;* and that the said Letters Patent should be read with this correction therein that the same may conform to the record of the case in the Patent Office.

Signed and sealed this 10th day of November, A. D., 1914.

[SEAL.]

R. F. WHITEHEAD,
*Acting Commissioner of Patents.*